W. F. McNABB.
SHOCK ABSORBER.
APPLICATION FILED MAR. 11, 1916.
1,207,426.
Patented Dec. 5, 1916.
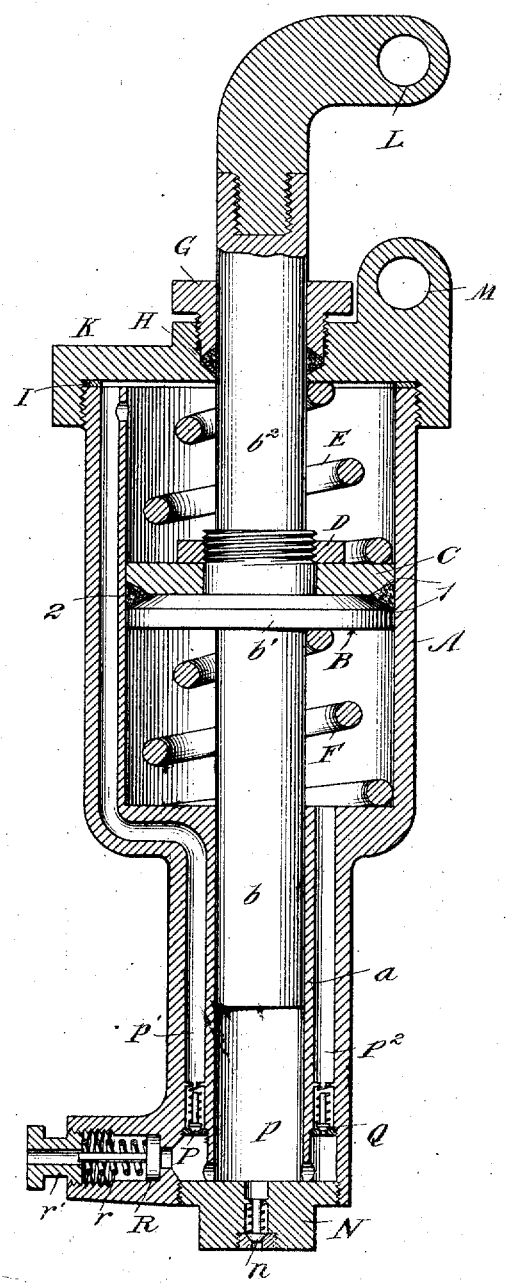

UNITED STATES PATENT OFFICE.

WILLIAM F. McNABB, OF CARTHAGE, MISSOURI.

SHOCK-ABSORBER.

1,207,426.

Specification of Letters Patent.

Patented Dec. 5, 1916.

Application filed March 11, 1916. Serial No. 83,522.

*To all whom it may concern:*

Be it known that I, WILLIAM F. McNABB, a citizen of the United States, and a resident of Carthage, in the county of Jasper and State of Missouri, have invented a new and Improved Shock-Absorber, of which the following is a full, clear, and exact description.

This invention relates to shock absorbers especially adapted for use in connection with automobiles, but it is not necessarily limited to this application.

The invention has for its general objects to improve and simplify the construction and operation of shock absorbers so as to be reliable and efficient in use, comparatively simple and inexpensive to manufacture and keep in operative condition, and so designed that it will automatically maintain its resiliency.

A more specific object of the invention is the provision of a device which not only absorbs the shock on the down stroke and the rebound on the up stroke, but also acts as a pump for maintaining a high air compression for both the direct down and rebound up movements of the parts.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention, the figure is a central vertical section of the shock absorber.

Referring to the drawing, A designates the cylinder, which has a tubular extension $a$ for forming a guide for the stem $b$ of the piston B. Besides acting as a guide, the part $a$ is an air compressor cylinder, and the stem $b$ is the plunger of the compressor. The piston B comprises an annular flange $b'$ and a washer-like member or disk C coöperating with the flange to form the piston head, and the opposed faces of the flange and member are beveled at 1 to form together a channel for receiving an oil-soaked leather packing ring 2. The parts of the piston head are kept together by a nut D. Acting on opposite sides of the piston head are connoidal springs E and F which serve to provide the necessary resiliency when there is no air pressure in the spaces at opposite sides of the piston head. The upper end of the cylinder is closed by a head in the form of a cap K through which the upper stem $b^2$ of the piston extends, there being a gland nut G and a packing ring H for maintaining an air-tight joint between the piston stem $b^2$ and the cap K, and a packing ring I maintains an air-tight joint between the cylinder and the cap. The upper end of the piston stem is connected at L with the vehicle body or upper half of the vehicle supporting springs, and the cylinder A is connected at M with the lower half of the springs, so that as the body bounds or rebounds there will be relative reciprocatory motion of the piston and cylinder. The lower end of the pump extension of the cylinder A is closed by a plug N which has an inlet check valve $n$ for the admission of air to the pump cylinder. The chamber $p$ of the pump is connected by passages $p'$ and $p^2$ with the upper and lower ends of the main cylinder A, and in these passages $p'$ and $p^2$ are check valves P and Q which open toward the cylinder A, whereby air can pass to either end of such cylinder when the pump plunger $b$ descends. At one side of the lower end of the device is a relief valve R which is backed by a spring $r$, the tension of which is adjustable by a nut $r'$ which has an opening whereby air can escape when the valve R opens, due to excessive pump pressure.

The piston B is designed to serve three purposes, viz: To absorb the shock on downward stroke and to absorb the rebound on upward stroke and vice-versa and to pump a maximum amount of air under high compression (as desired) at the lower extremity of the piston thereby replenishing the supply of compressed air exhausted through leakage.

The springs E and F are used in the cylinder for the purposes of prevention of destruction and injury to any of the parts when the shock absorber is put into action after any extensive period of inactivity or lack of use as it is almost if not entirely impractical to contain air under pressure for any length of time unless the leakage of air is replenished. After about nine strokes of the piston, the tension on the springs should be relieved by the air pressure.

The principal features of the shock absorber are: To first provide a means of supporting the piston during inaction and until action occurs (which is done with springs E and F.) Second,—to absorb the shock gradually but effectively in the air cushion formed by compressed air in bottom of cylinder A. Third,—to absorb the rebound by an equal and gradual effective air cushion formed by compressed air in top of cylinder A. Fourth,—to supply a maximum amount of air during action (regardless as to how small the vibration) under high compression to replace the exhausted air due to leakage.

As an example of operation: A sudden shock is transmitted from the lower spring on bearing M which forces the cylinder A downward from present position of piston B, thereby gradually increasing the air pressure in upper portion of cylinder (the air contained having been previously compressed by reciprocal action) and gradually absorbing the shock. This same movement of the cylinder (downward) causes the lower end of the piston rod to draw inward a charge of air through the air inlet valve n which opens automatically when the air is drawn in and closes automatically on first movement toward compression; at the same time the air is drawn in through n, the compression inlet air valves P and Q close automatically until compression occurs, at which time they both open automatically and permit the compressed air to enter the ports leading to the upper and lower portions of the cylinder. The compression in both lower and upper portions of cylinder must be equal at all times as, in the event air in upper portion of cylinder should leak out more rapidly than in the lower portion, the additional amount of air required to bring the pressure in the upper portion up to the same pressure as in the lower portion, will be supplied proportionately faster to the upper part of the cylinder because there will be less resistance on the air inlet valve P which will cause it to open first and allow the compressed air to enter first at that point until the pressure in upper and lower ends of cylinder is equal, after which time the compressed air is furnished to both ends of the cylinder in proportionate quantity according to the maximum air pressure for which the governing blow-off valve R is set.

The blow-off or governor valve R is designed to control the maximum air pressure which may be desired to carry in the both ends of the cylinder. This valve can be adjusted to blow off or pop at any desired pressure. In the event considerable shock or vibration has been absorbed by this shock absorber there will naturally be an excess of compressed air above the amount required for easy riding and when both the upper and lower portions of the cylinder A have been filled to normal carrying pressure of say eighty pounds, the pump or compressor end of the cylinder compresses the air to ninety pounds, which is ten pounds above the amount of air pressure for which the governor R is set. This excess pressure causes the valve R to open automatically and exhaust the excess ten pounds of pressure, then closes automatically when the pressure has been reduced to the set eighty pounds.

The means of attaching this shock absorber to the ends of the upper and lower spring leaves of an automobile may be designed in a number of ways, but the simple method shown is sufficient to illustrate the support. Any standard attachment on a shock absorber requires a change of the spring or frame attachments on an automobile.

The cost of manufacturing this shock absorber will be comparatively low as compared to the manufacturing costs of various other shock absorbers of the air cushion type now on the market, as it is of simple design, requiring very little machine work, having few parts and designed in such a manner that it can be assembled easily and quickly. A special feature that is carried out in the design is accessibility, quick and simple replacements and low cost of replacement.

This shock absorber is self-lubricating. A small quantity of oil (light oil) poured into the upper and lower halves or portions of the cylinder will automatically circulate the oil throughout the cylinder owing to the almost consant air currents and return of the oil by gravity to a point where it is forced to again circulate through the working parts.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A combined shock absorber and air compressor comprising a cylinder, a piston therein having a stem, spring means between the piston and cylinder to yieldingly resist motion in both directions, a cylinder connected with the first cylinder and into which the stem of the piston extends to form an air compressor, valve-controlled passages leading from the air compressor to the opposite ends of the first-mentioned cylinder for supplying air thereto, and a valve-controlled inlet for the second-mentioned cylinder.

2. A combined shock absorber and air compressor comprising a cylinder, a piston therein having a stem, spring means between the piston and cylinder to yieldingly resist motion in both directions, a cylinder connected with the first cylinder and into which the stem of the piston extends to form an air compressor, valve-controlled passages leading from the air compressor to the opposite ends of the first-mentioned cylinder for supplying air thereto, a valve-controlled inlet for the second-mentioned cylinder, and a relief valve connected with the second cylinder.

3. As a new article of manufacture, a combined shock absorber and air compressor in the form of a unitary structure comprising a cylinder, a piston therein, springs interposed between each end of the cylinder and the piston, passages leading to both ends of the cylinder, valves in the passages and opening toward the cylinder, a compressor actuated by the relative movement of the piston and cylinder for supplying air to the passages, and a valve-controlled inlet for the compressor.

4. As a new article of manufacture, a combined shock absorber and air compressor in the form of a unitary structure comprising a cylinder, a piston therein, springs interposed between each end of the cylinder and the piston, passages leading to both ends of the cylinder, valves in the passages and opening toward the cylinder, a compressor actuated by the relative movement of the piston and cylinder for supplying air to the passages, a valve-controlled inlet for the compressor, and a relief valve common to the said passages and compressor.

5. A device of the class described comprising a cylinder having a reduced tubular extension, a piston movable in the cylinder and having stems extending in opposite directions, one out of the cylinder and the other into the tubular extension to form therewith an air pump, passages leading from the bore of the extension to the opposite ends of the cylinder for supplying air from the pump to the latter, valves in the said passages, and a valve-controlled inlet for admitting air to the said tubular extension.

In testimony whereof I have signed my name to this specification in the presence of two subscribing witnesses.

WILLIAM F. McNABB.

Witnesses:
A. L. THOMAS,
EDITH HARKER.